(12) United States Patent
Ronsen

(10) Patent No.: US 9,139,136 B2
(45) Date of Patent: Sep. 22, 2015

(54) APPARATUS AND METHOD TO RETROFIT A SLIDING DOOR OPENING OF A VAN

(71) Applicant: David Ronsen, Encinitas, CA (US)

(72) Inventor: David Ronsen, Encinitas, CA (US)

(*) Notice: Subject to any disclaimer, the term of this patent is extended or adjusted under 35 U.S.C. 154(b) by 0 days.

(21) Appl. No.: 14/489,205

(22) Filed: Sep. 17, 2014

(65) Prior Publication Data
US 2015/0001890 A1 Jan. 1, 2015

Related U.S. Application Data

(63) Continuation of application No. 14/298,811, filed on Jun. 6, 2014.

(60) Provisional application No. 61/832,770, filed on Jun. 7, 2013.

(51) Int. Cl.
*B60R 3/02* (2006.01)
*B60J 5/06* (2006.01)

(52) U.S. Cl.
CPC . *B60R 3/02* (2013.01); *B60J 5/062* (2013.01); *Y10T 29/49716* (2015.01)

(58) Field of Classification Search
CPC .................................. B60R 3/02; B60J 5/062
USPC .................................................. 296/155, 178
See application file for complete search history.

(56) References Cited

U.S. PATENT DOCUMENTS

| | | | | | |
|---|---|---|---|---|---|
| 2,667,230 | A | * | 1/1954 | Duff et al. | 180/294 |
| 3,847,292 | A | * | 11/1974 | Williams et al. | 414/541 |
| 3,905,638 | A | * | 9/1975 | Persico | 296/26.02 |
| 3,907,357 | A | * | 9/1975 | Davis, Jr. | 296/146.5 |
| 4,346,931 | A | * | 8/1982 | Merkle | 296/148 |
| 4,930,797 | A | * | 6/1990 | Parrill | 280/166 |
| 5,224,723 | A | * | 7/1993 | Hatas | 280/166 |
| 5,342,073 | A | * | 8/1994 | Poole | 280/166 |
| 6,071,064 | A | * | 6/2000 | Hackett | 414/545 |
| 6,793,269 | B2 | * | 9/2004 | Pugh et al. | 296/146.9 |

* cited by examiner

*Primary Examiner* — Joseph D Pape

(57) ABSTRACT

A van includes an interface element and one or more doors. The interface element can be a frame or connector that is configured to fit a sliding door opening of the van. The one or more doors are configured to fit the interface connector of the van. The one or more doors are configured to be operable by a driver of the van.

14 Claims, 6 Drawing Sheets

APPARATUS AND METHOD TO RETROFIT A SLIDING DOOR OPENING OF A VAN

CROSS-REFERENCE TO RELATED APPLICATIONS

The present application claims priority to U.S. patent application Ser. No. 14/298,811, filed Jun. 6, 2014 entitled "APPARATUS AND METHOD TO RETROFIT A SLIDING DOOR OPENING OF A VAN", which claims priority to U.S. Provisional Patent Application Ser. No. 61/832,770, filed Jun. 7, 2013, entitled "APPARATUS FOR A FOLDING DOOR IN A PASSENGER VAN." U.S. patent application Ser. No. 14/298,811 and U.S. Provisional Patent Application No. 61/832,770 are hereby incorporated by reference into the present application as if fully set forth herein. The present application hereby claims priority under 35 U.S.C. §119(e) to U.S. Provisional Patent Application No. 61/832,770.

TECHNICAL FIELD

This application relates to doors of a van, and more specifically to bus-style doors that retrofit an opening on a side sliding door of a van.

BACKGROUND

Passenger vans, such as American passenger vans, are vans used to transport passengers that are smaller and cheaper to operate than a full size bus. A typical passenger van is designed as a conversion of a standard cargo van, which is adapted to carry multiple passengers. One such example of an American passenger van is the ECONOLINE by FORD MOTOR COMPANY (Ford). Another example of an American passenger van is the SAVANA by GENERAL MOTORS CORPORATION (GMC). However, as a conversion of a cargo van, the American passenger van does not include a door properly configured to facilitate access via a side of the passenger van to enable the passengers to enter and exit the passenger van.

SUMMARY

This disclosure provides a method and system for providing and operating bus-style doors on a van style vehicle.

In certain embodiments, a van is provided. The van includes a bus door apparatus. The bus door apparatus includes an interface element configured to fit a sliding door opening of the van. The bus door apparatus also includes one or more bus-style doors configured to fit the interface element of the van. The one or more bus-style doors are configured to be operable by a driver of the van.

In certain embodiments, a method for converting a van is provided. The method includes removing a sliding door from the van. The method also includes fitting an interface element into a sliding door opening of the van, the sliding door opening comprising a via left after removal of the sliding door. The method also includes fitting one or more doors to the interface element of the van. The one or more doors are configured to be operable by a driver of the van.

In certain embodiments, an apparatus is provided. The apparatus includes an interface element configured to fit a sliding door opening of a van. The apparatus also includes one or more bus-style doors configured to fit the interface element of the van. The one or more bus-style doors are configured to be operable by a driver of the van.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
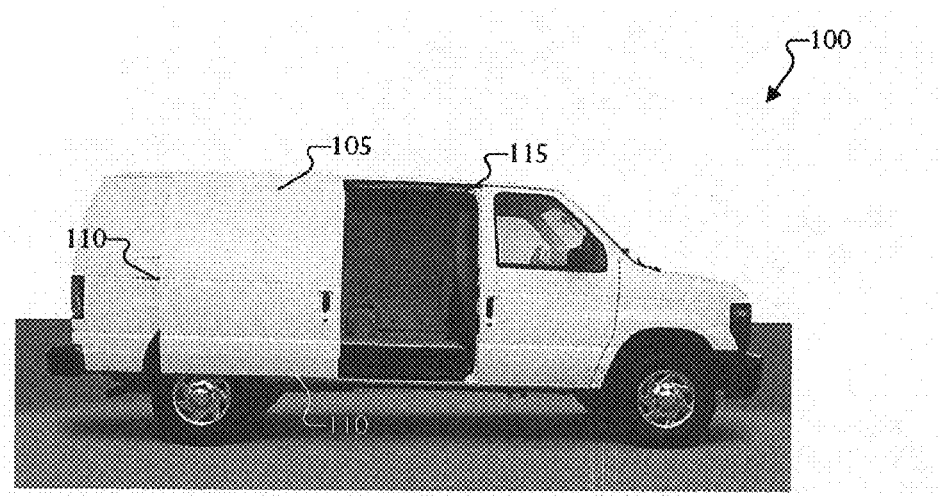
FIG. 1A illustrates a sliding door according to the present disclosure.

FIGS. 1A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cellular system.

In certain cargo vans, such as the ECONOLINE, a sliding door is provided to enable passengers to enter and exit the vehicle. However, the sliding door uses a large footprint, twice the width of the door, and can be cumbersome to operate. Recently, the ECONOLINE style passenger vans, that is, the style of passenger vans that is a conversion of a cargo van, are being replaced by European style van. European style van refers to tall, skinny vans that have been used outside of North America for many decades and that are now becoming available in the United States. With the advent of the American van reaching its end of life, resulting in the phasing out of vans such as the ECONOLINE and SAVANA, and coinciding with the introduction of several European style van platforms, embodiments of the present disclosure provide method and apparatus for the up-fitting and modification of the European style van into a minibus platform style van (hereinafter "Minibus"). A Minibus is a five to twenty passenger bus or multi-purpose passenger vehicle, as termed by the Department of Transportation The Minibus includes a design that is slightly narrower than American vans. The Minibus, which is based on the European style van platform, are designed to be exceptionally large inside and outperform the ECONOLINE vans and SAVANA vans in virtually every measureable way. In certain embodiments, the Minibus is dimensioned to weigh less than 8 tons (16,000 pounds).

In certain embodiments, the Minibus is designed as a van, such as a European style van, that is retrofitted with a non-sliding door. For example, the Minibus can include a bus-door apparatus (BDA) configured to use of an opening (also known as a portal) that previously would be used by a sliding door. The BDA enables a retrofitting (e.g., post manufacture redesign and installation) of a bus-door style (BDS) door into the van. In contrast to a sliding door that operates to open and close the opening via sliding motion along a side of the van, the BDS doors operate in a non-sliding motion manner that is mechanically different than that of the sliding door. In certain embodiments, the original sliding door can be removed completely. In certain embodiments, a portion of the original sliding door can be reused as a part of the frame for the new bus-door style door. The BDA and associated BDS door that is retrofitted to the van does not slide. The BDS door can be configured to be a double door, a bi-fold door, a parallel door, or a sedan door. In certain embodiments, a double door includes two doors that rotate towards each other to close and away from each other to open. In certain embodiments, a bi-fold door includes two folding doors that fold away from each other to open and towards each other to close. A parallel door includes one or more doors that remain parallel to the side of the van to which they operate while opening and closing. A sedan door is a hinged door, much like the doors found on most modern automobiles that rotate about the hinge into an open position or a closed position.

Figure 1B:
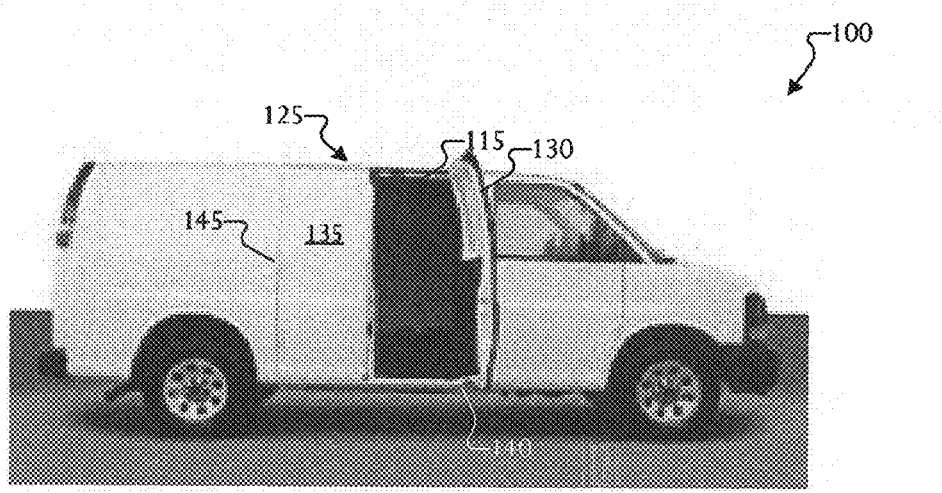
FIG. 1B illustrates a double door according to the present disclosure.
Figure 1C:
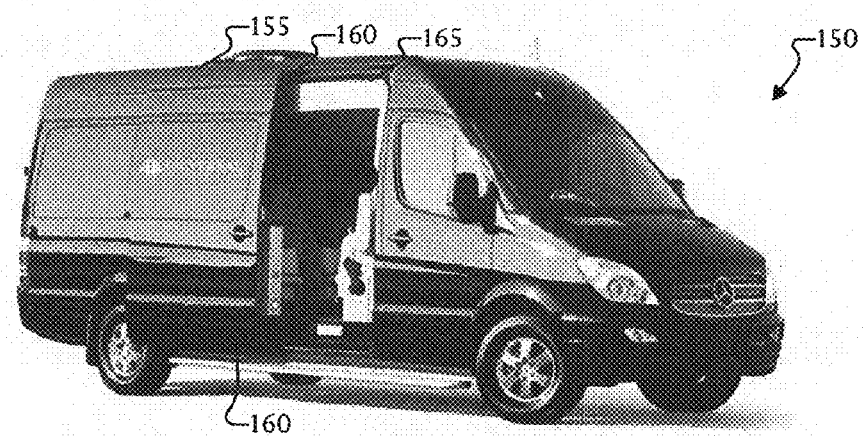
FIG. 1C illustrates a sliding door on a European style van according to the present disclosure.

FIG. 1A illustrates a sliding door according to the present disclosure. FIG. 1B illustrates a double door according to the present disclosure. FIG. 1C illustrates a sliding door on a European style van according to the present disclosure. The embodiments of the doors shown in FIGS. 1A, 1B and 1C are for illustration only. Other embodiments could be used without departing from the scope of the present disclosure.

Certain American vans 100 include a sliding door 105, such as an Original Equipment Manufacturer (OEM) sliding door. The sliding door 105 is configured to traverse a track 110 disposed along an outer edge of a side of the van 100. In a closed position, the sliding door 105 recesses into the door opening 115 (i.e., portal). Also when in the closed position, an exterior surface of the sliding door 105 is flush with the exterior side of the van 100. The door opening 115 is dimensioned to accommodate the sliding door 105 and, as such, is much smaller than an adult person. Therefore, when entering or exiting the van 100, a person is required to bend extensively to fit through the door opening 115. In addition, the sliding door 105 is configured with interior paneling for appearance and associated hardware to enable the driver or passengers to open and close the door. The interior paneling, although designed to align with and complement the interior cabin of the van 100, intrudes into the cabin of the van 100.

Certain American vans 100 include a double door 125. The double door 125 includes a first door 130 and a second door 135, each of which is configured to rotate about a respective hinge. That is, the first door 130 rotates about a first hinge 140 and the second door rotates about the second hinge 145 on a side of the van 100. In a closed position, the double door 125 recesses into the door opening 115 (i.e., portal). Also when in the closed position, an exterior surface of the double door 125 is flush with the exterior side of the van 100. The door opening 115 is dimensioned to accommodate both the first door 130 and the second door 135 of the double door 125 and, as such, is much smaller than an adult person. Therefore, when entering or exiting the van 100, a person is required to bend extensively to fit through the door opening 115. In addition, the double door 125 is configured with interior paneling for appearance and associated hardware to enable the driver or passengers to open and close the door. The interior paneling, although designed to align with and complement the interior cabin of the van 100, intrudes into the cabin of the van 100.

Certain European style vans 150 include a sliding door 155. The sliding door 155 is configured to traverse a track 160 disposed along an outer edge of a side of the European style van 150. In a closed position, the sliding door 155 recesses into the door opening 165 (i.e., portal). Also when in the closed position, an exterior surface of the sliding door 155 is flush with the exterior side of the European style van 150. The door opening 165 is dimensioned to accommodate the sliding door 155 and also is dimensioned to better accommodate an adult person. In addition, the sliding door 155 is configured with interior paneling for appearance, insulation and associated hardware to enable the driver or passengers to open and close the door. The interior paneling, although designed to align with and complement the interior cabin of the van 100, intrudes into the cabin of the European style van 150 and into the door opening 165. Accordingly, when entering or exiting the van 100, a person still is required to step up and bend to fit through the door opening 115.

Figure 2A:
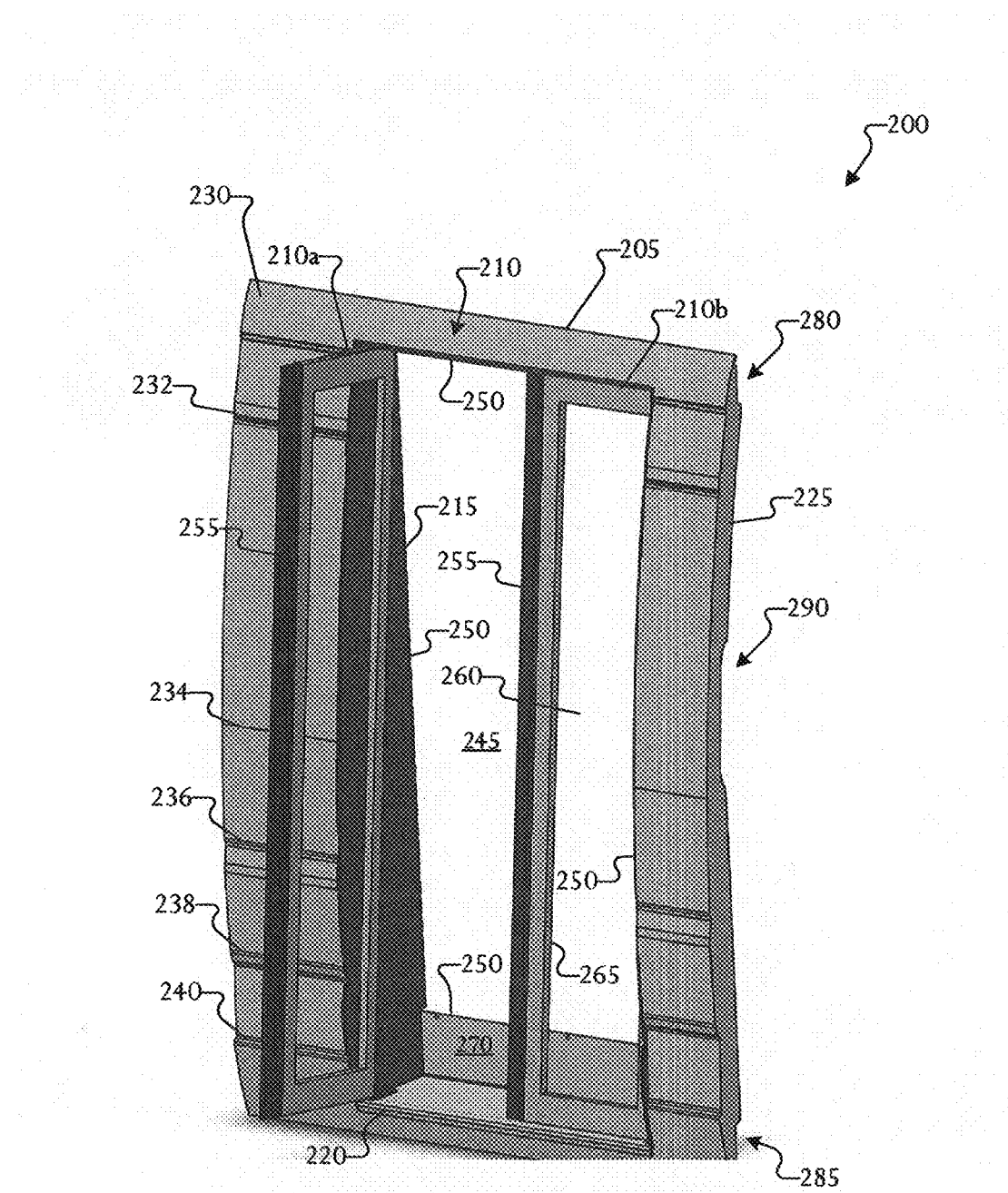
FIGS. 2A and 2B illustrate a bus-door apparatus according to embodiments of the present disclosure.
Figure 2B:
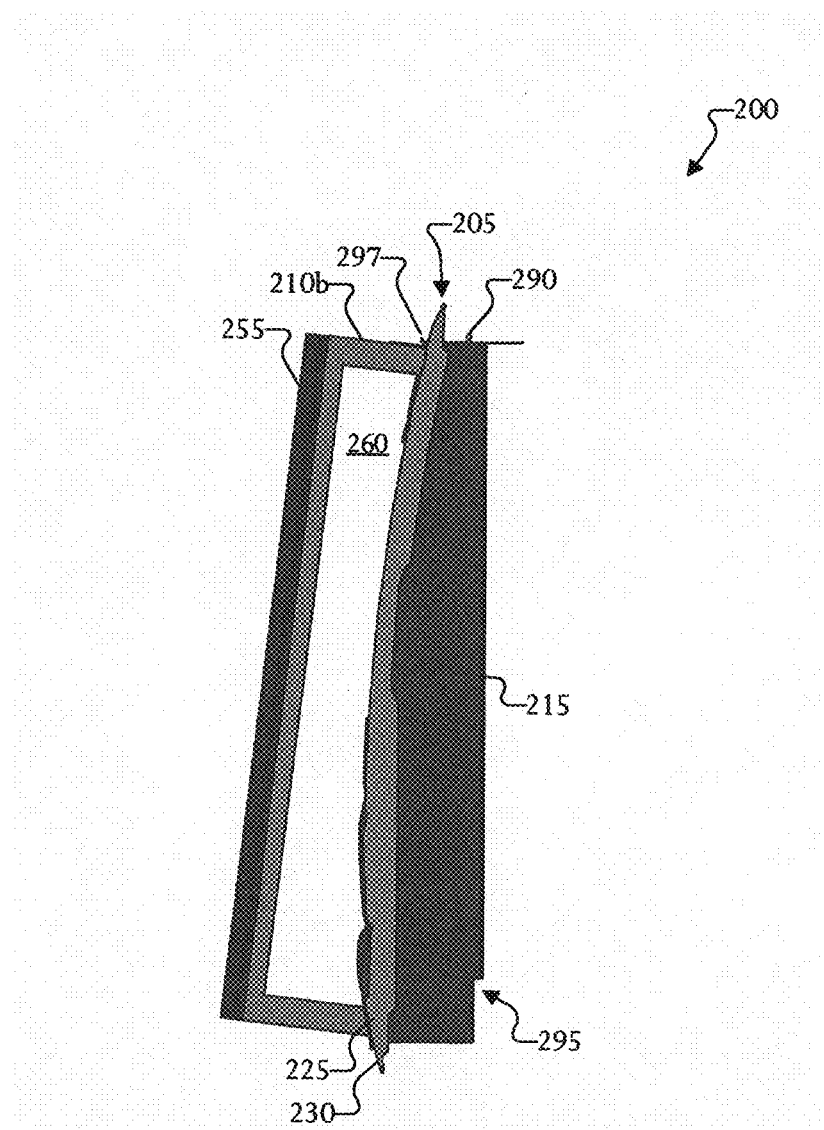

FIGS. 2A and 2B illustrate a BDA according to embodiments of the present disclosure. The embodiments of the BDA shown in FIGS. 2A and 2B are for illustration only. Other embodiments could be used without departing from the scope of the present disclosure.

The BDA 200 includes an interface element, such as a frame 205, configured to fit a side opening of a European style van, such as European style van 150. For example, the door opening can be dimensioned to accommodate a sliding door. The frame 205 fits within the door opening 165 (or portal) of the European style van 150 that was originally created to be used in combination with the sliding door 155 for controlling access to the European style van 150. In certain embodiments, the door opening 165 is widened to accommodate the frame 205. For example, the door opening 165 can be increased in a vertical direction to increase a height of the side opening, in a horizontal direction to increase a width of the door opening 165, or in a combination of a vertical direction and a horizontal direction. The frame can be tied back to the door opening 165. The frame 205 provides support for door unit 210 that includes one or more doors. In the example shown in FIG. 2A, the door unit 210 includes a first door 210a and a second door 210b. The Frame 205 includes jambs 215, sill 220, and interface portions 225 configured to couple to the door opening 165. For example, the interface portions 225 can be configured similar to edges of the sliding door 155, which is for use with the original opening of European style van 150. In certain embodiments, the interface element is a rubber-like connecter configured to be disposed between the BDA 200 and the door opening 165. The rubber-like connecter is comprised of any suitable rubber-like material such as, but not limited to, natural rubber, a polymer, an artificial elastomer, or any suitable material that can undergo elastic deformation under stress and return to its previous size without permanent deformation.

The BDA 200 includes an outer skin 230. The outer skin 230 includes body lines 232, 234, 236, 238, and 240. The size of the outer skin 230 can be varied to accommodate the size (e.g., area) of the door opening 165. For example, when the door opening 165 is larger than an area of the door unit 210 when in a closed position. Body lines 232, 234, 236, 238, and 240 enhance the decorative and ornamental appearance to conform and complement the exterior of the European style van 150. In certain embodiments, body lines 232, 234, 236, 238, and 240 are configured to provide rigidity to the outer skin 230. The BDA 200 includes a via 245 to provide access through the BDA 200. The via 245 is define by at least four edges 250.

The door unit 210 is configured to fit within the via 245. In certain embodiments, the door unit 210 further is configured to provide a substantial seal of the interior of the European style van 150 when the door unit 210 is in a closed position. That is, when closed, the door unit 210 inhibits the flow of liquid or gaseous matter through the via 245. In certain embodiments, the door unit 210 includes two doors configured as double doors that rotate about hinges to open and close. In certain embodiments, the door unit 210 includes two doors configured as bi-fold doors that fold towards each other to close and fold away from each other to open. In certain embodiments, the door unit 210 includes a single door configured rotate about a hinge to open and close. The hinge can be located on any side of the frame 205, such as a right side, left side, bottom or top of the frame 205. In certain embodiments, the door unit 210 includes a single door configured as a folding door that includes one or more hinges along a panel surface of the door to enable to door to fold to open or unfold to close.

The door unit 210 includes one or more weather-strip seals 255 coupled to the respective doors of the door unit 210. For example, the weather-strip seals 255 are fitted to door 210a and door 210b, respectively. The weather-strips seals 255 provide a weatherproof capability for the door unit 210 to inhibit the effects of adverse weather, such as cold, wind and rain, from traversing through the via 245 when the door unit 210 is closed and to lessen the sound of when door 210a and 210b touch while closed and when being closed.

In certain embodiments, the door unit 210 includes a window 260. The window 260 can be comprised of glass, PLEXIGLASS, or any suitable transparent material. In certain embodiments, the door 210a includes a window 260 and the door 210b includes a window 260. Although the example shown in FIG. 2A illustrates that the door 210a includes a window 260 and the door 210b includes a window 260, embodiments in which only one door includes the window 260 are contemplated within the scope of this disclosure. In certain embodiments, the window 260 can encompass substantially the entire respective door to which it is included. For example, the door 210b can be comprised of a frame 265 configured and reinforced to secure window 260. The window 260 provides an operator of the door unit 210 the ability to see if a person or other object is standing in the way of the door unit 210 thereby enabling the operator to not operate the door unit 210 to avoid possible injuries to the persons or objects standing in the way of the door unit 210.

The jambs 215 vertical support for the door 210a and the door 210b between sill 220 and a header or lintel above the door 210a and the door 210b. The jambs 215 are coupled, or otherwise joined, to respective interface portions 225 of the door opening 165, sill 220, and riser 270, such as by a weld or other known coupling method.

In certain embodiments, the door unit 210 includes a riser 270 to facilitate passenger access to a finished floor height interior of the vehicle. The riser 270 extends between sill 220 and the finished floor of the European style van 150. In certain embodiments, the riser 270 is configured to prevent access to space underneath a floor of the European style van 150. In certain embodiments, the riser 270 is configured to provide a lower point of entry for passengers entering the European style van 150. That is, the riser 270 is designed as a lower step that, in combination with a vertical height of the via 245, enables a passenger to readily enter the European style van 270 without substantial bending required. The riser 270 is coupled, or otherwise joined, to the jambs 215 and to sill 220, such as by a weld or other known coupling method. In certain embodiments, the riser 270 can move to meet the passenger. The door unit 210 can include one or more electronic, mechanical or pneumatic elements to extend, retract, raise or lower the riser 270. For example, the riser 270 can be extended out when the doors are open and retracted when the doors are closed. In certain embodiments, the door unit 210 is configured such that an opening to the door unit 210 is twenty-one inches off the ground and such that the riser 270 is not required or included. In certain embodiments, the riser 270 is fixed or a tread is incorporated, or both.

In certain embodiments, the door unit 210 includes a sill 220. The sill 220 provides horizontal support for the door unit 210, or the door 210a and 210b individually, between jambs 215. The sill 220 is coupled, or otherwise joined, to interface portion 225, jamb 215, and riser 270, such as by a weld or other known coupling method. The sill 220 is configured, in conjunction with riser 270, to operate as a step for a passenger to enter or exit the European style van 150. When used as a step, sill 220 extends as a tread between a front portion of the frame 205 and the riser 270.

In certain embodiments, the interface portion 225 is designed to marry the door unit 210 to the door opening 165 and is formed from one or more parts of the original sliding door 155 that was originally provided with the European style van 150. In certain embodiments, one or more parts of the original sliding door 155 skin and interface portion 225 can be used when an area of the opening, e.g., door opening 165, is larger than an area of the door unit 210 when in a closed position. For example, the original sliding door 155, including the frame and skin, is cut to form interface portion 225 and outer skin 230. The interface portion 225 and outer skin 230 are formed to allow the door unit 210 to be fitted within via 245. That is, the first door 210a and the second door 210b are fitted and coupled within jambs 215, sill 220, and a header or lintel.

In certain embodiments, the BDA 200 includes a top notch 275, a bottom notch 280 and concavity 285 that provide rigidity and support for the frame 205. The top notch 275 and the bottom notch 280 are configured to enable the frame 205 to fit to the door opening 165 of the European style van 150.

In certain embodiments, the door unit 210 includes a number of pivot joints 290. The pivot joints 290 are configured to respectively couple the first door 210a and the second door 210b to the door unit 210. The pivot joints 290 connect the first door 210a and the second door 210b to an actuator disposed in the header of frame 205. The pivot joints 290 also are configured to enable the first door 210a and the second door 210b to rotate or fold between open and closed positions.

The actuator that is located within the header of the frame 205 provides mechanical force sufficient to open and close the first door 210a and the second door 210b. The actuator can be electrical, hydraulic, pneumatic, or the like. The actuator is controlled by a driver of the European style van 150 to enable access to the van or to the outside of the van. In certain embodiments, the actuator is disposed at other locations, such as outside the frame 205 or within the European style van 150, such as at a side of, or below, the door opening 165 to which frame 205 is coupled. The BDA 200 also is configured with an emergency release for manual operation of the door unit 210.

In certain embodiments, the BDA 200 includes a rear notch 295. The rear notch 295 is disposed proximate to the 215 and at a planar height corresponding to a floor of the European style van 150. The rear notch 295 is configured to enable a secure fitment of frame 205 to the door opening 165 of the European style van 150.

In certain embodiments, the BDA 200 also includes a rain gutter 297 that is configured to fit on a header of the frame 205. The rain gutter 297 is configured to prevent water from flowing from a roof of the European style van 150 into the via 245.

Figure 3A:
FIGS. 3A and 3B illustrate a van including a double door according to embodiments of the present disclosure.
Figure 3B:
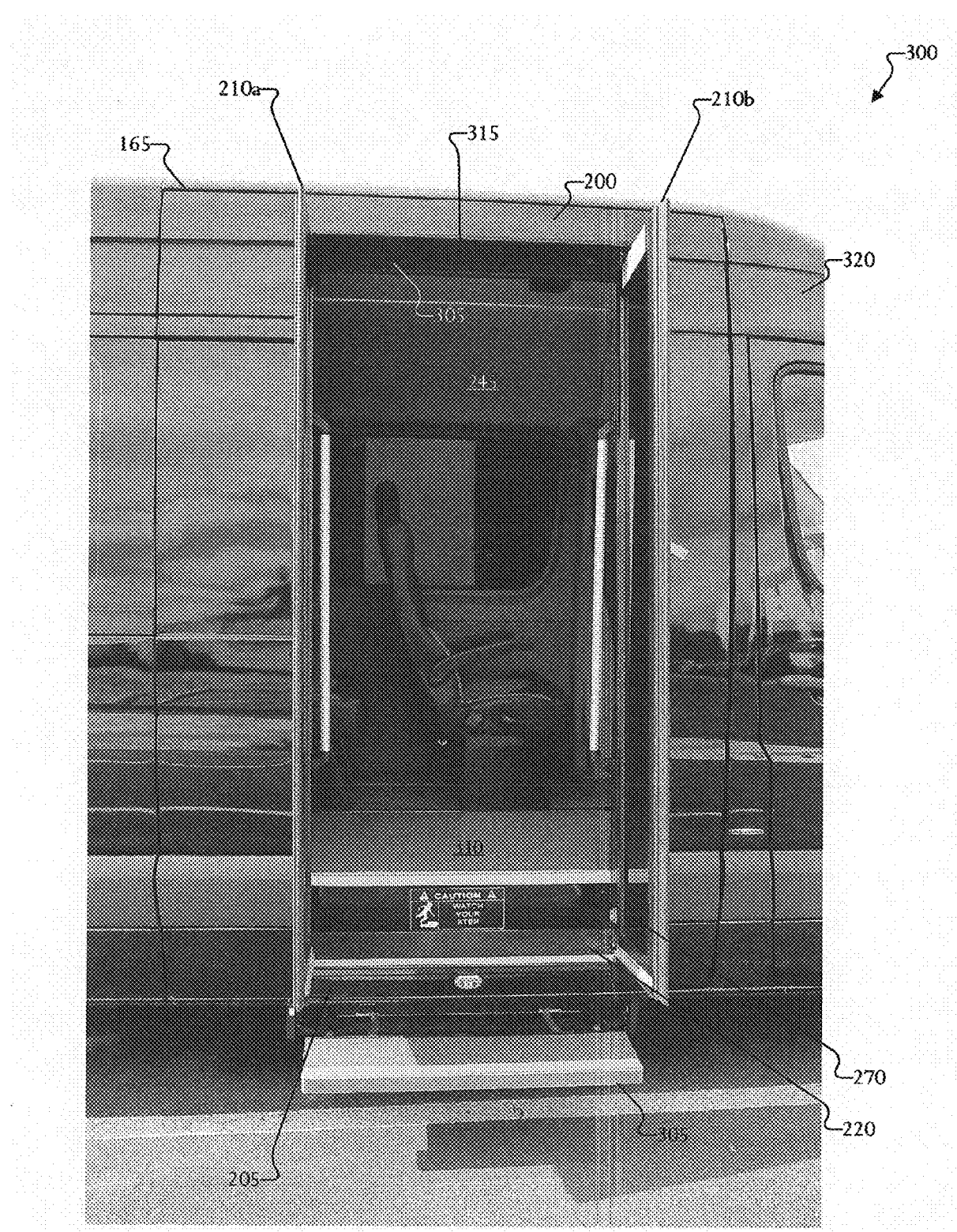

FIGS. 3A and 3B illustrate a van including a double door according to embodiments of the present disclosure. The embodiments shown in FIGS. 3A and 3B are for illustration only. Other embodiments could be used without departing from the scope of this disclosure. FIGS. 3A and 3B include references to features and/or elements that are conceptually similar to similarly numbered references of FIGS. 2A and 2B and whose description are not repeated. In the example shown in FIGS. 3A and 3B, a double door is installed, or otherwise coupled to, a modified van 300, such as a European style van 150.

The BDA 200 is configured to fit securely into the door opening 165. For example, after removal of the sliding door 155, the BDA 200 is configured to fit within the door opening 165 in a manner similar to the way in which the sliding door 155 within the door opening 165 when closed. In certain embodiments, the door opening 165 is modified to be wider, taller, or both, to couple to the BDA 200. The outer skin 230 is patterned with body lines 232, 234, 236, 238, and 240 that align with corresponding body lines on the modified van 300. The outer skin 230 also is painted to match a paint scheme, or pattern, of the modified van 300.

In certain embodiments, the modified van 300 includes an exterior step 305. The exterior step 305 is configured to provide passengers easier access to the inside of the modified van 300. The exterior step 305 is extendable such that it operates in conjunction with the door unit 210. That is, when the first door 210a and the second door 210b are open, the exterior step 305 extends to an extended position to provide an additional step. Additionally, when the first door 210a and the second door 210b are in a closed state, the exterior step 305 retracts to a retracted state underneath a floor of the modified van 300.

A finished floor 310 of the modified van 300 provides a base for passengers to walk within the modified van 300. The finished floor 310 is disposed at a planar level above sill 220, necessitating riser 270 and for passengers to step up from the frame 205 to the finished floor 310. In certain embodiments, the finished floor 310 is disposed at different planar levels with respect to frame 205. For example, the finished floor 310 can be at the same level as the sill 220 such that no step is required. In certain embodiments, the finished floor 310 is disposed below the sill 220 of the frame 205 such that a step down from the opening of the frame 205 is required to reach the finished floor 310. In certain embodiments, the finished floor 310 is disposed such that the finished floor 310 is twenty-one inches off the ground and such that the riser 270 is not required or included.

The modified van 300 can be configured to transport passengers via roads or configured as a specialty vehicle, such as, but not limited to, a mobile health clinic, mobile library, mobile marijuana dispensary (where allowed by law), mobile tactical vehicle (such as for police, fire or military), a delivery vehicle, bookmobile or bloodmobile. The modified van 300 includes via 245 created by open doors 210a and 210b in the BDA 200, which is coupled to the modified van 300 in the door opening 165 that was originally designed for use with a sliding door 155. Passengers may enter and exit the modified van 300 through via 245. The door opening 165 was originally configured for a sliding door that slid on one or more tracks in order to open and close. The one or more of the tracks are optionally removed or covered when the van is retrofitted with frame 205.

A header 315, also known as a lintel, is at a top portion of the frame 205. The header 315 provides horizontal support between jambs 215. In certain embodiments, the header 315 includes the actuator that is used to open and close the first door 210a and the second door 210b. In certain embodiments, the header includes one or more weather-strip seals 320 configured to provide a weatherproof capability for the door unit 210 to inhibit the effects of adverse weather, such as cold, wind and rain, from traversing through the via 245 when the door unit 210 is closed and to lessen the sound of when the first door 210a and the second door 210b are being closed.

In the example shown in FIGS. 3A and 3B, the BDA 200 includes a double door. The double door includes the first door 210a and the second door 210b. Each door of the double door is configured to rotate about a respective pivot joint 290. For example, the first door 210a rotates as a single element about a first pivot joint while the second door 210b rotates as a single element about a second pivot joint. The first door 210a and the second door 210b each maintain a planar form as the doors are rotated open. When in an open state, the first door 210a and the second door 210b are substantially perpendicular to a side surface 320 of the modified van 300. When in a closed state, the first door 210a and the second door 210b are substantially parallel to a side surface 320 of the modified van 300.

In certain embodiments, the BDA 200 includes one or more bi-fold doors. For example, the bi-fold door can be a folding door configured as a single door that includes one or more hinges. The bi-fold door can be coupled to the jamb 215 via a pivot point 290. The bi-fold door includes two or more door panels coupled together via the one or more hinges. The one or more hinges are disposed vertically along a planar surface of the bi-fold door. The bi-fold door is configured to rotate about the pivot point 290 as folds occur in the one or more hinges enabling the bi-fold door to collapse (i.e., fold) into two or more smaller segments in a manner similar to an accordion fold. When in the open position, the panels are rotated about the hinges such that the panels are substantially parallel to each other and substantially perpendicular to a side surface 320 of the modified van 300. When in a closed state, the door panels are rotated such that each panel is substantially parallel to a side surface 320 of the modified van 300.

In certain embodiments, the BDA 200 includes a combination of double and bi-fold doors. For example, one or more of the first door 210a and the second door 210b can include two or more door panels coupled together via the one or more hinges. The one or more hinges are disposed vertically along a planar surface of the respective door. The door, configured with the one or more hinges, is configured to rotate about the pivot point 290 as folds occur in the one or more hinges enabling the respective door to collapse (i.e., fold) into two or more smaller segments in a manner similar to an accordion fold. When in the open position, the panels are rotated about the hinges such that the panels are substantially parallel to each other and substantially perpendicular to a side surface 320 of the modified van 300. When in a closed state, the door panels are rotated such that each panel is substantially parallel to a side surface 320 of the modified van 300.

Figure 4:
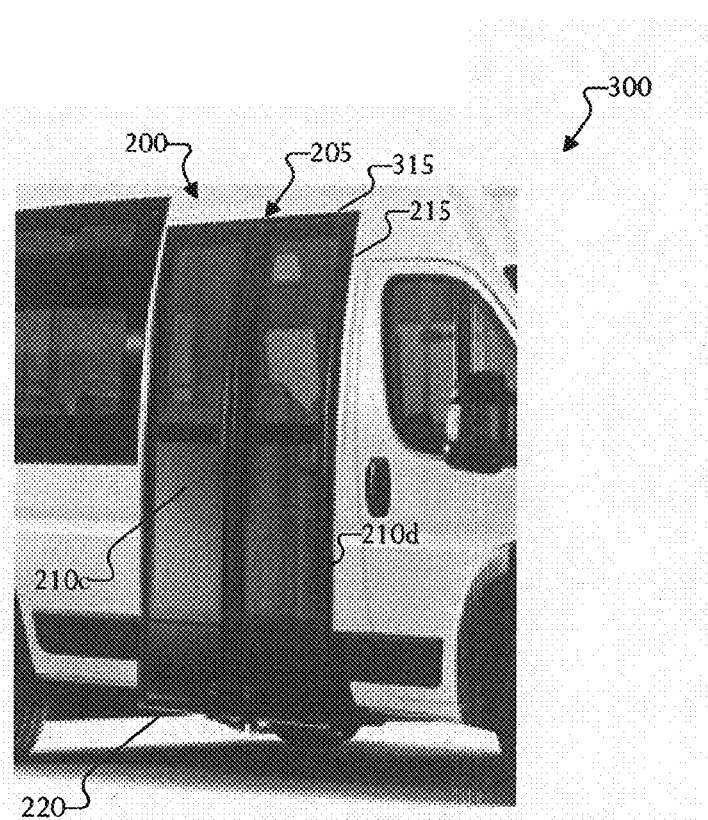
FIG. 4 illustrates a van including a parallel double door according to embodiments of the present disclosure.

FIG. 4 illustrates a van including a parallel double door according to embodiments of the present disclosure. The embodiment shown in FIG. 4 is for illustration only. Other embodiments could be used without departing from the scope of this disclosure. FIG. 4 includes references to features and/or elements that are conceptually similar to similarly numbered references of FIGS. 1A through 3B and whose description may not be repeated. In the example shown in FIG. 4, the BDA includes two parallel doors; however, embodiments with more one parallel door could be used without departing from the scope of the present disclosure.

In certain embodiments, the BDA 200 does not include interface portions 225. That is, when closed, the first door 210a and the second door 210b substantially fill the entire area of the door opening 165 so that a remaining portion of the original sliding door is not required. For example, the jambs 215 can be disposed adjacent to edges of the frame 205 and proximate to edges of the door opening 165. In addition, the header 315 and sill 220 also can be disposed adjacent to edges of the frame 205 and proximate to edges of the door opening 165.

In the example shown in FIG. 4, the door unit 210 includes a first door 210c and a second door 210d, which are configured as parallel doors. In operation, the first door 210c and the second door 210d remain parallel to each other and the side of van 320 while opening and closing. When opening and closing, the first door 210c and the second door 210d swing out about six to eight inches and slide forward and back by about the width of the door.

In the example shown in FIG. 4, the jamb 215 of frame 205 extends out from a bottom portion of the modified van 300. The frame 205 is fitted within the door opening 165. In addition, the first door 210c and the second door 210d are fitted within the frame 205.

The header 315 includes a lintel configured to horizontally support the jambs 215. In the example shown in FIG. 4, the header 315 does not include an actuator to operate the first door 210c and the second door 210d. The actuator to operate the first door 210c and the second door 210d can be located alongside the doors unit (i.e., alongside the first door 210c and the second door 210d) and frame 205 and proximate to a floor of the modified van 300. An emergency release can be included for manual operation of the door unit 210. In certain embodiments, the actuator is disposed underneath the doors.

Figure 5:
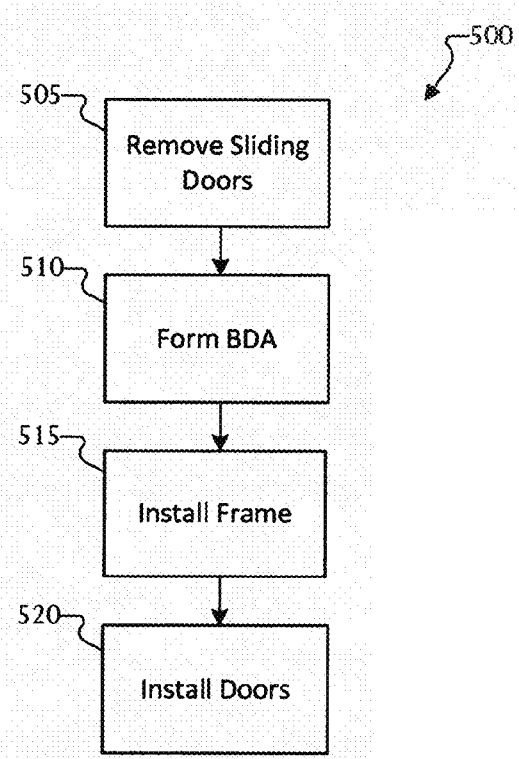
FIG. 5 illustrates a process 500 for retrofitting a sliding door opening of a van according to embodiments of the present disclosure.

FIG. 5 illustrates a process 500 for retrofitting a sliding door opening of a van according to embodiments of the present disclosure. While the flowchart depicts a series of sequential steps, unless explicitly stated, no inference should be drawn from that sequence regarding specific order of performance of steps, or portions thereof, serially rather than concurrently or in an overlapping manner, or performance the steps depicted exclusively without the occurrence of intervening or intermediate steps. The process depicted in the example is implemented with a van.

In block 505, a sliding door, such as an OEM sliding door, is removed from a van. One or more tracks on which the original sliding door moved can be covered or removed. The van can be any style of van, such as a European style van. The van can be dimensioned to weigh less than a conventional passenger bus, that is, the van weighs less than 8 tons (16,000 pounds). In certain embodiments, the van is configured to weigh less than or equal to 4 tons. In certain embodiments, the van is configured to weigh less than or equal to 2 tons.

In block 510, a BDA is configured. The BDA is formed by constructing a frame capable of coupling to one or more doors to respective jambs in a frame. The frame is dimensioned to fit the sliding door opening in the van left after removal of the sliding doors. In some embodiments, the frame exceeds a size of the door opening in order to enable a person to comfortably, safely, and ergonomically enter and exit the vehicle. The frame includes one or more pivot joints configured to couple to respective portions of the doors. The doors can be double doors, bi-fold doors, parallel doors, a sedan door, or a combination thereof. In certain embodiments, the doors can be dimensioned to fit a via that is fifty to eighty inches high and thirty-six to seventy inches wide. One or more drive motors, actuators, gears, lever arms, process controllers and circuitry, or a combination thereof are included in the BDA to operate the doors. The doors are configured to swing open, fold open, rotate open, or combination thereof. The doors include weather stripping and seals configured to inhibit the effects of weather and noise from penetrating the cabin of the van. The doors also can include one or more clear panels, such as glass, configured to enable a view through the doors by the door operator. In certain embodiments, a retracting step is coupled to the BDA. The retracting step is configured to operate in conjunction with an operation of the doors. In certain embodiments, the drive motors, actuators, gears, lever arms, process controllers and circuitry, or a combination thereof also operate the retracting step. In certain embodiments, the BDA does not include the retracting step (i.e., the retracting step is optional). In certain embodiments, the BDA includes interface portions configured to couple to the van. The interface portions are formed from portions of the removed sliding door. That is, portions of the sliding door are cut away, or otherwise removed, and reformed to fit the BDA. The interface portions include an outer skin configured to match a paint color and pattern of the van as well as respective contour lines of the van. The interface portions also can include interior paneling configured to match a color scheme and countering of the interior of the van.

In block 515, the BDA frame is fitted to the sliding door opening of the van. The frame is dimensioned to fit the opening and replaces the original sliding door. The frame can include an interface portion comprising a portion of the original sliding door. In certain embodiments, the retracting step is not coupled directly to the frame, but is, instead, coupled a frame of the van. The retracting step is then coupled electronically to the drive motors, actuators, gears, lever arms, process controllers and circuitry, or a combination thereof to operate the retracting step. In certain embodiments, the retracting step includes its own drive motors, actuators, gears, lever arms, process controllers and circuitry, or a combination thereof and is coupled electronically to receive signals transmitted from an operator consol (i.e., controller), from the BDA processing circuitry, or a combination thereof.

In block 520, the one or more doors are coupled to the BDA. The doors are attached to respective pivot joints or hinges. The one or more doors are configured as bi-fold doors, parallel doors, a sedan door, or a combination thereof, which are different from the original sliding door. The one or more doors are configured to be operable by a driver of the van via a button, a lever, a switch, a control panel located proximate to and within reach of the driver, a remote control, key fob, a key, or a combination of these. The one or more doors are configured to be operable by a wired or wireless communications means.

Although various features have been shown in the figures and described above, various changes may be made to the figures. For example, the size, shape, arrangement, and layout of components shown in FIGS. 1A through 4 are for illustration only. Each component could have any suitable size, shape, and dimensions, and multiple components could have any suitable arrangement and layout. Also, various components in FIGS. 1A through 4 could be combined, further subdivided, or omitted and additional components could be added according to particular needs. Further, each component in a device or system could be implemented using any suitable structure(s) for performing the described function(s). In addition, while FIG. 5 illustrates various series of steps, various steps in FIG. 4 could overlap, occur in parallel, occur multiple times, or occur in a different order. The embodiments described herein are provided for illustration and explanation. One or more features from any of the described embodiments can be incorporated into other embodiments without departing from the scope of the disclosure.

What is claimed is:

1. A method for converting a van, the method comprising:
    removing a sliding door from the van;
    fitting an interface element into a sliding door opening of the van, the sliding door opening comprising a via left after removal of the sliding door, a top edge of the sliding door opening disposed proximate to an original roof of the van; and
    fitting one or more doors to the interface element of the van, wherein the one or more doors are dimensioned to accommodate an adult person and configured to be operable by a driver of the van.

2. The method of claim 1, further comprising:
    configuring the one or more doors one of: a double door, a bi-fold door, a parallel door, and a sedan door; and
    retrofitting the one or more doors to the van.

3. The method of claim 1, further comprising:
    coupling a sill of the frame to a floor of the van with one or more of a tread and a riser within the interface element.

4. The method of claim 1, wherein the one or more doors are operable from outside the van.

5. The method claim 1, wherein the interface element comprises at least one of: a frame or a rubber-like connector.

6. The method of claim 1, further comprising:
    modifying the sliding door opening to couple to the interface element.

7. The method of claim 1, further comprising:
    installing an actuator configured to operate the one or more doors.

8. A method for converting a vehicle, the method comprising:
    removing an original door from the vehicle;
    fitting an interface element into a door opening of the vehicle, the door opening comprising a via left after removal of the original door, the door opening dimensioned such that a vertical height of the opening is at least sixty inches, the interface element comprising a header proximate to the original roof; and
    fitting one or more doors to the interface element of the vehicle, wherein the one or more doors are configured to be operable by a driver of the vehicle.

9. The method of claim 8, further comprising:
    configuring the one or more doors as one of: a double door, a bi-fold door, a parallel door, and a sedan door; and
    retrofitting the one or more doors to the vehicle.

10. The method of claim 8, further comprising:
    coupling a sill of the interface element to a floor of the vehicle with one or more of a tread and a riser within the interface element.

11. The method of claim 8, wherein when the door opening is larger than the one or more doors in a closed position, the method further comprises:
    forming at least a portion of the interface element from a portion of cut original door, the portion of the original door less than a whole of the original door.

12. The method claim 8, wherein the interface element comprises at least one of: a frame or a rubber-like connector.

13. The method of claim 8, further comprising:
    modifying the door opening to couple to the interface element, by widening the door opening in a horizontal direction.

14. The method of claim 8, further comprising:
    installing an actuator configured operate the one or more doors.

* * * * *